United States Patent
Mitsubori

(10) Patent No.: US 6,897,979 B1
(45) Date of Patent: May 24, 2005

(54) MULTI-LEVEL IMAGE READING APPARATUS CAPABLE OF DETECTING AND CORRECTING COLOR POSITION OFFSETS

(75) Inventor: Toshiyuki Mitsubori, Kawasaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/482,614

(22) Filed: Jan. 14, 2000

(30) Foreign Application Priority Data

Jan. 20, 1999 (JP) .......................................... 11-011260

(51) Int. Cl.⁷ ............................ H04N 1/48; H04N 1/60; H04N 1/047
(52) U.S. Cl. ...................... 358/1.9; 358/513; 358/504; 358/518
(58) Field of Search .......................... 358/1.9, 513, 514, 358/516, 468, 448, 504, 505, 518, 530; 382/274, 317

(56) References Cited

U.S. PATENT DOCUMENTS

| | | | | |
|---|---|---|---|---|
| 5,361,145 A | * | 11/1994 | Hasegawa | 358/514 |
| 5,438,364 A | * | 8/1995 | Maeshima et al. | 348/223.1 |
| 5,734,759 A | * | 3/1998 | Hirota et al. | 382/274 |
| 5,892,595 A | * | 4/1999 | Yamakawa et al. | 358/530 |
| 5,917,620 A | * | 6/1999 | Hasegawa et al. | 358/513 |
| 5,946,537 A | * | 8/1999 | Nakayasu et al. | 399/301 |
| 6,198,896 B1 | * | 3/2001 | Nakayasu et al. | 399/301 |
| 6,408,156 B1 | * | 6/2002 | Miyazaki et al. | 399/301 |
| 6,577,408 B1 | * | 6/2003 | Rusnack et al. | 358/1.9 |
| 6,687,472 B2 | * | 2/2004 | Udaka et al. | 399/49 |

FOREIGN PATENT DOCUMENTS

| | | | | |
|---|---|---|---|---|
| JP | 08085236 | * | 2/1996 | ............ B41J/2/525 |
| JP | 10-51649 | | 2/1998 | ............ H04N/1/48 |

* cited by examiner

Primary Examiner—Scott Rogers
(74) Attorney, Agent, or Firm—Morrison & Foerster LLP

(57) ABSTRACT

An image reading apparatus that reads color images by means of scanning the document surface with CCD sensors that correspond to red (R), green (G) and blue (B) colors respectively, comprising: a diagonal line pattern 4 provided within the CCD sensors' reading ranges; a color shift correction factor arithmetic unit 40 that detects color shifts from the data obtained by reading the diagonal line pattern and calculates correction factors; and a correction arithmetic unit 42 that corrects the document image data for each color component read in the previous step using the calculated correction factors.

14 Claims, 5 Drawing Sheets

MULTI-LEVEL IMAGE READING APPARATUS CAPABLE OF DETECTING AND CORRECTING COLOR POSITION OFFSETS

This application is based on Japanese Patent Application No. 11-011260 filed on Jan. 20, 1999, the contents of which are hereby incorporated by reference.

BACKGROUND OF THE INVENTION

1. Field of the Invention

The present invention relates to an apparatus for reading images and its method, in particular, an apparatus for reading color images and its method.

2. Description of the Related Art

Many apparatuses for reading color images have been developed in recent years. The typical image reading apparatus is an apparatus called the color image scanner.

Various constitutions have been devised for reading color images. For example, Kokai Koho (Publication of Unexamined Patent Application) No. JP-A-10-51649 disclosed a color scanner comprising three color, i.e., red (R), green (G) and blue (B), CCD line image sensors on which reflecting lights from the document surface are focused to form each color's image as a carriage equipped with a light source travels.

This scanner repeatedly scans the document with the three CCD sensors and outputs color converted image data for each scan. As the image is read while the carriage is travelling, the scanner had a problem that a slightest discrepancy between different color images being read can cause color distortions when color images are overlaid to recreate natural color images.

In order to solve this problem, the scanner disclosed by said Koho is equipped with a pattern consisting of diagonal lines within the reading range of the CCD sensors and reads said diagonal line pattern as well as the document image for each color using the CCD sensors. Thus, the scanner is capable of detecting any positional errors of the pixels in the secondary scanning direction from the actually read image of the diagonal pattern. The scanner corrects the pixel position error detected for each color during the reproduction process of the color image so that the pixels of each color element can be accurately overlaid, thus to provide a color image without any color distortion.

However, the scanner disclosed by said Koho requires that the travelling speed of the carriage be kept constant while reading the image using the travelling carriage. The color correction procedure mentioned above is to compensate for any color shift that can occur despite the effort of maintaining a constant carriage speed. In order to maintain a constant carriage travel speed, a high accuracy is required for the mechanical system, which results in increasing the manufacturing cost of the scanner.

In order to provide a less expensive scanner, a new type of scanner has been developed in recent years which reads the image using a stationary carriage in lieu of a travelling carriage described above. This new type of carriage stops temporarily after moving in the secondary scanning direction a distance corresponding to a line of image parallel to the main scanning direction, i.e., parallel to the lines the photodiodes of the CCD sensors are arranged and reads the image line by line by means of the RGB color CCD sensors when the carriage is stationary. Such a type of scanner reads a line of image in the main scanning direction when the CCD sensors are stationary, so that it has an advantage that there is no need for maintaining a constant carriage travelling speed with a great accuracy.

However, this type of scanner that reads the image incrementally with the RGB color CCD scanners as it travels and stops for each line of image may cause a problem that the image reading starts when the carriage has not yet completely stopped due to the inertia of the carriage's weight or a slip of the timing belt or other mechanical components.

More specifically, if the scanner is to read the image in the order of R, G and B, the R color CCD sensor starts to read one line of image as soon as the carriage's motion for one line is completed, but the reading may start before the carriage completely stops due to the inertia or the mechanical slip mentioned above. On the other hand, the readings by the G and B color CCD sensors are done after the R color CCD sensor has completed its reading. Therefore, it is quite likely that the carriage becomes completely still during the reading of the R color CCD sensor. As a result, the positions of the pixels of the line read by the G and B color CCD sensors may be offset from the positions of the pixels read by the R color CCD sensor.

In such a case, if the RGB color CCD sensors are all reading a solid color area, a minor position error does not matter as the RGB color CCD sensors still read the same colors respectively and overlaying of the scanned image data reproduce the image of the same original color. However, if the scanner is reading a color boundary area, the G and/or B color CCD sensors read different color pixels across the color boundary, different from the color pixels the R color CCD sensor reads. Therefore, overlaying of color images read independently by different color sensors may cause color shifts and may not reproduce the actual document color in the color boundary area.

In order to avoid this color shift phenomenon, one may attempt to improve the machining accuracy of the mechanical components to minimize the slipping of the mechanical system such as a timing belt. Alternatively, one may attempt to take a longer lead time between the instruction for carriage stop and the instruction for image reading start, so that the image reading starts only after the CCD sensors on the carriage have completely stopped. This may improve the color shift to a certain degree.

However, increasing the machining accuracy of the mechanical system leads to the cost increase and cancels the intended cost reduction effect by means of reading the image while the carriage is at still. Moreover, the slip of the mechanical system is unpredictable in terms of when and where it occurs, so that it is extremely difficult to eliminate the slip completely by means of increasing the machining accuracy. On the other hand, an extra waiting time provided between the instructions to stop the carriage and to start reading the image slows down the image reading speed substantially and is undesirable from the standpoint of reducing the work cycle time.

SUMMARY OF THE INVENTION

An object of the present invention is to provide an image reading apparatus and an image reading method that are capable of reproducing color images without any color shifts and without sacrificing the reading speed.

One aspect of the present invention is an image reading apparatus comprising: multiple reading devices that can read images split into multiple colors individually, wherein said reading devices can travel in a secondary scanning direction; a pattern provided within the multiple reading devices' reading ranges consisting of diagonal lines set at a certain angle against the secondary scanning direction; an arithmetic unit that calculates a correcting factor for each color based on data obtained as the multiple reading devices read the pattern; and a correcting unit that corrects image data based on the correcting factors, where the image data being obtained as the multiple reading devices read a document image.

Another aspect of the present invention is an image reading apparatus capable of reading color images by means of scanning a document surface using multiple photoelectric conversion means of different reading wavelengths, comprising: a diagonal line pattern provided within reading ranges of said photoelectric conversion means; a color shift detection means that detects color shifts from diagonal line pattern data obtained as said photoelectric conversion means read said diagonal line pattern; a correction factor calculating means that calculates a correction factor to be used for correcting color shifts for each color component based on the diagonal line pattern read by said photoelectric conversion means when said color shift detection means detects color shifts; and a color correction means that corrects document image data value for each reading wave length read by said photoelectric conversion means based on the correction factors calculated by said correction factor calculating means.

Yet another aspect of the present invention is an image reading method for reading color images by scanning the document surface by means of multiple photoelectric means with different reading wavelengths; a step of reading the document image as well as an achromatic diagonal line pattern provided within said photoelectric conversion means' reading range; a step of detecting color shift from the diagonal line pattern thus read; a step of calculating correction factors for correcting color shift from the data of the diagonal line pattern data read in the previous step when color shift is found; and a step of correcting based on the calculated correction factor the data of the document image read at the image reading step.

Since color shift is detected from the data obtained by reading the diagonal line pattern, the correction factor is calculated from the diagonal line pattern data when color shift is detected, and the data obtained by reading the document image is corrected based on this correction factor, the color shift that occurred during the image reading is corrected properly to provide a good color image without any color shifts.

The objects, features and characteristics of the present invention other than those set forth above will become apparent from the description given herein below with reference to preferred embodiments illustrated in the accompanying drawings.

DETAILED DESCRIPTION OF THE PREFERRED EMBODIMENT

The embodiment of the present invention will be described below with reference to the accompanying drawings.

Figure 1:
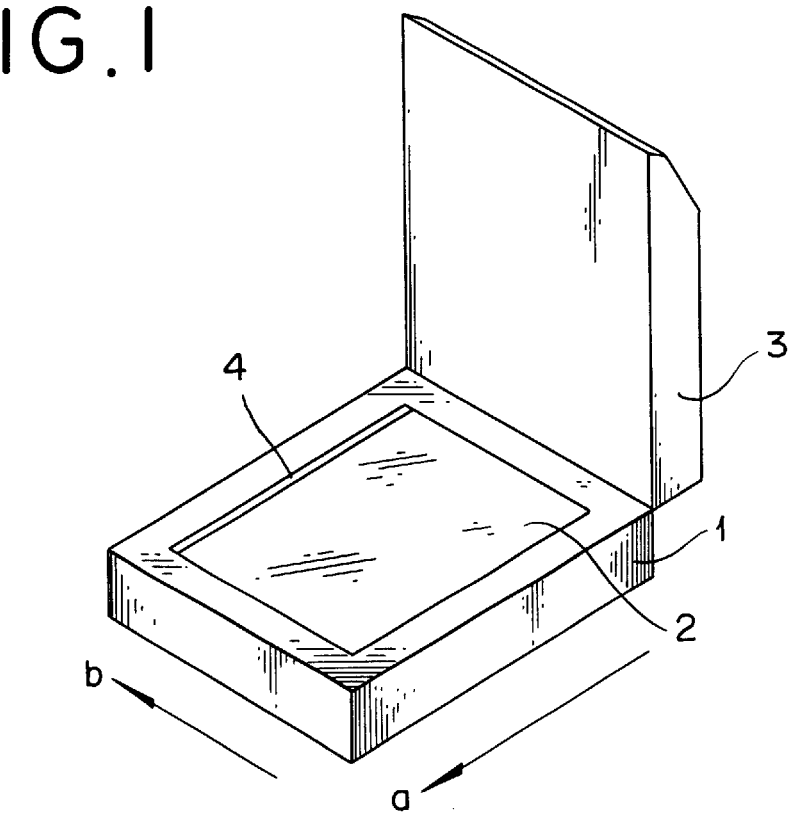
FIG. 1 is a perspective view of a scanner according to the present invention.

As shown in FIG. 1, the scanner of this embodiment, similar to the prior art, consists of a scanner main body 1, a contact glass 2 provided on the main body 1 on which the document is placed, and a cover 3 that covers the entire surface of the contact glass 2. The scanner of the present invention has a diagonal line pattern 4 provided at an edge of the contact glass 2 as indicated in the drawing.

Figure 5:
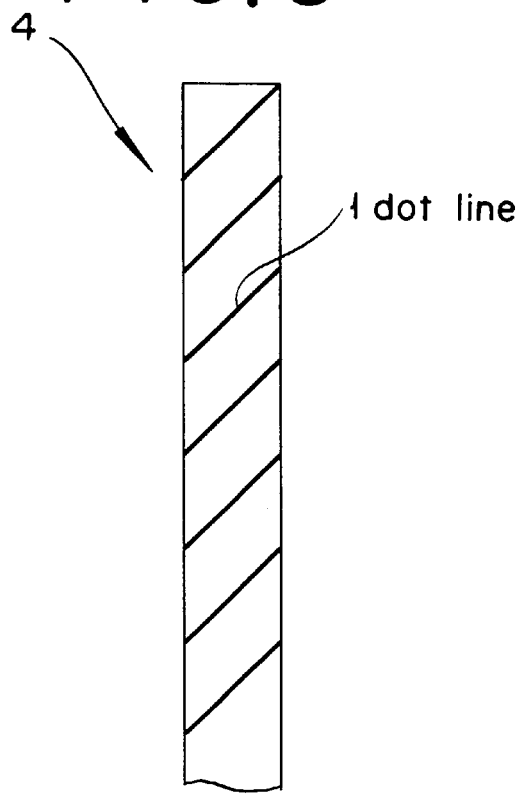
FIG. 5 is a drawing showing a view of the diagonal line pattern provided in the scanner from the sensor side.

The diagonal line pattern 4 consists of multiple black lines with one dot width drawn in a 45° angle across a white band as seen from the bottom side on the CCD sensor side as shown in FIG. 5. The diagonal line pattern 4 is read simultaneously with the reading of the document image by the CCD sensors. This diagonal line pattern 4 is used for detecting color shifts as described later, but it is also used for calculating the correction factor for correcting the color shifts. The reason diagonal lines are used for the diagonal line pattern as shown in the drawing is that a diagonal line and a line in the main scanning direction crosses each other at a point and not at any other point, so that it is better than using other types of lines, for example, a line parallel to the main scanning line for detecting color shifts accurately.

Moreover, this diagonal line pattern 4 is provided on the surface of the contact glass 2. As a result, the diagonal line pattern 4 forms the same plane as the document surface when the document is placed on the contact glass 2. Therefore, the diagonal line pattern 4 can be read on the same plane as the document surface to be read even if the document is thick. If it is only to read a thin document's image, the diagonal line pattern 4 can be provided on the bottom surface edge of the cover 3 within the reading range of the CCD sensors where it does not interfere with the document.

Figure 2:
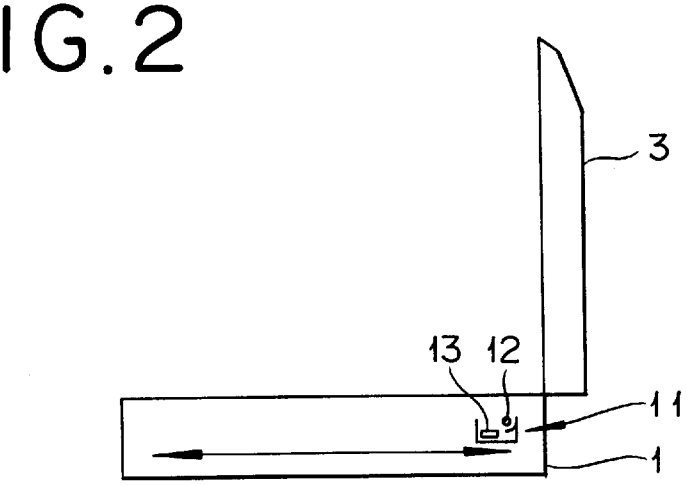
FIG. 2 is a side view showing an outline of the internal structure of the scanner.

The mechanical structure within the scanner main body 1 is as shown in FIG. 2. The carriage 11 that travels driven by a stepping motor and a timing belt not shown here is provided in the scanner main body 1. Inside the carriage 11 provided are a white light source 12 and color CCD sensor unit 13 that reads the reflecting light from the document surface lighted by the white light source 12 in R, G and B colors separately. The color CCD sensor unit 13 consists of three contact type CCD sensors that work as the photoelectric conversion means having different reading wavelengths. The three CCD sensors with different reading wavelengths correspond to R, G and B colors.

The travel direction of the carriage 11 is the secondary scanning direction shown by an arrow "a" in FIG. 1 and the direction the photodiodes that constitute the CCD sensors are arranged is the main scanning direction shown by an arrow "b" in FIG. 1. The internal constitution of the scanner main body 1 of this embodiment is common to other scanners using so-called contact type CCD sensors, so that its detailed description is skipped here.

The basic reading operation is conducted as follows: First, the document is placed on the contact glass 2 with the image reading surface on the bottom. Next, the carriage 11 driven by the stepping motor repeats travel-and-stop cycles in the secondary scanning direction to scan each line of image in the main scanning direction. During this scanning, the CCD sensors for RGB colors sequentially reads a line of image in the main scanning direction while the carriage 11 is at still.

Next, let us describe the constitution of the control circuit that processes the image signal.

Figure 3:
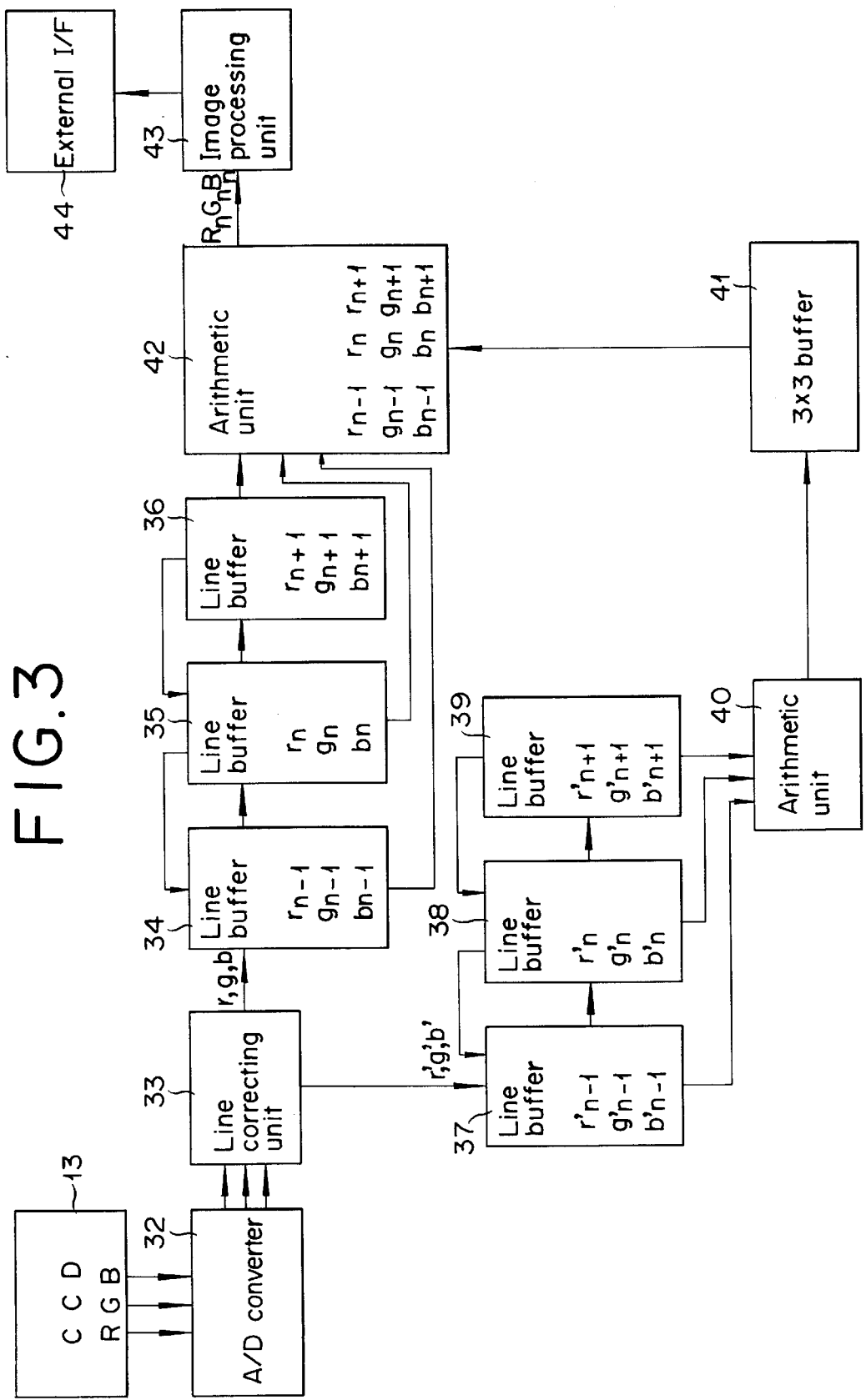
FIG. 3 is a block diagram of a control system that takes care of image signal processing for the scanner.

As shown in FIG. 3, the control circuit of this scanner comprises: an A/D converter 32 that receives the R, G, and B analog signals outputted from the CCD sensors of individual colors included in the color CCD sensor unit 13 and converts them into digital signals; a line correction unit 33 that receives the output from the A/D converter 32 and outputs the RGB components of the image data of the same line; line buffers 34, 35 and 36 that store the image data for every (n−1)-st line, n-th line and (n+1)-st line among the RGB components of the image data outputted by the line correction unit 33; line buffers 37, 38 and 39 that store the image data for every (n−1)-st line, n-th line and (n+1)-st line data among the RGB components of the diagonal line pattern data; a correction factor arithmetic unit 40 that detects any color shift that occurred from the diagonal line pattern stored in the line buffers 37, 38 and 39 and calculates the correction factor for correcting the color shift that occurred; a 3×3 buffer 41 that temporarily stores the calculated correction factor; a color shift correction arithmetic unit 42 that reads the correction factor from the 3×3 buffer 41 and performs correction of the color shift on the document image data stored in the line buffers 34, 35 and 36; an image processing unit 43 that conducts image processing such as MTF correction and shading correction; and an external interface (I/F) 44 that outputs the image data to the outside of the control circuit. The "n" of the "n lines" here represents a variable that is equal to the number of lines that has been read.

The color CCD sensor unit 13 consists of three CCD sensors as described already. CCD sensors are placed approximately 5 to 10 lines, or in actual dimensions 0.5–1 mm, apart from each other. Therefore, the lines read by each one of the RGB color CCD sensors when the carriage stops, i.e., the R line, the G line and the B line, are different lines. This means that the line that is read when the carriage stops is different depending on the color under a normal operation, which is a unique problem not existed in the prior art. It is the function of the line correction unit 33 to correct the differences in the line positions read by the RGB color CCD sensors caused by the layout of these three CCD sensors. More specifically, if the CCD sensors are arranged in the order of RGB with reference to the carriage travelling direction, the controller outputs the G-line data with a delay of approximately 5–10 lines relative to the B-line data and the R-line data with a delay of approximately 5–10 lines relative to the G-line data, i.e., approximately 10–20 lines relative to the B-line data. This makes it to output the data of the same line with reference to the B-line. The actual number of lines to be delayed should be determined according to the relative positions of the CCD sensors and the reading resolution.

Although the line buffers 34, 35 and 36 and the line buffers, 37, 38 and 39 are shown for each line in FIG. 3, in reality, a single line buffer stores each line data corresponding to each individual RGB color component.

In this embodiment, the color shift correction factor arithmetic unit 40 functions as the color shift detection means and the correction factor calculating means as described later in conjunction with the line buffers 37, 38 and 39. Also, the color shift correction arithmetic unit 42 functions as the color shift correction means.

The actions of the image signal process by the control circuit constituted as above will be described in detail referring to the flow charts shown in FIG. 6 and FIG. 7.

First, the signal the CCD sensors obtained by reading the document image is inputted into the line correction unit 33 via the A/D converter 32 to correct the reading line differences between the R, G and B color CCD sensors.

Among the image data outputted from the line correction unit 33, a portion of the data extending from the start to the dot number corresponding to the document width is stored for each color portion as the document image data for the n-th line in the line buffer 35, and the data for the remaining dot numbers of the n-th line, i.e., the diagonal line pattern for the n-th line, is stored in the line buffer 38 for each component (S1).

Next, the carriage travels for one line and stops, and the document image data for the (n+1)-st line us stored in the line buffer 36 for each color element similar to Step S1, and the data for the diagonal line pattern is stored in the line buffer 39 for each color (S2).

The document image data and the diagonal line pattern data for the (n−1)-st line have already been stored as the data one line before the n-th line in the process of Step S12 to be described later.

Next, the correction factor arithmetic unit 40 detects an achromatic pixel that is below the threshold value "t" from the diagonal line data stored in the line buffer 38 (S3).

If no light is detected by neither of the RGB color CCD sensors when the CCD sensor reads the diagonal line pattern, it is considered a total achromatic color. If the gradation is expressed as a digital data, for example, in 8 bits, gradation 0 is a total achromatic color, and gradation 255 is white. An achromatic color below the threshold "t" is an achromatic color below the gradation "t" among the 0–255 gradations expressed as a gray scale in reference to black. On the other hand, a chromatic color is a color generated by overlaying the signals from RGB color CCD sensors when each of the RGB color CCD sensors receives a different quantity of light. Therefore, the detection of an achromatic pixel below the threshold value "t" is conducted by detecting a pixel that has the same data value for each of the RGB components and is below the threshold value "t" among the pixels stored in the line buffer 38.

Figure 4:
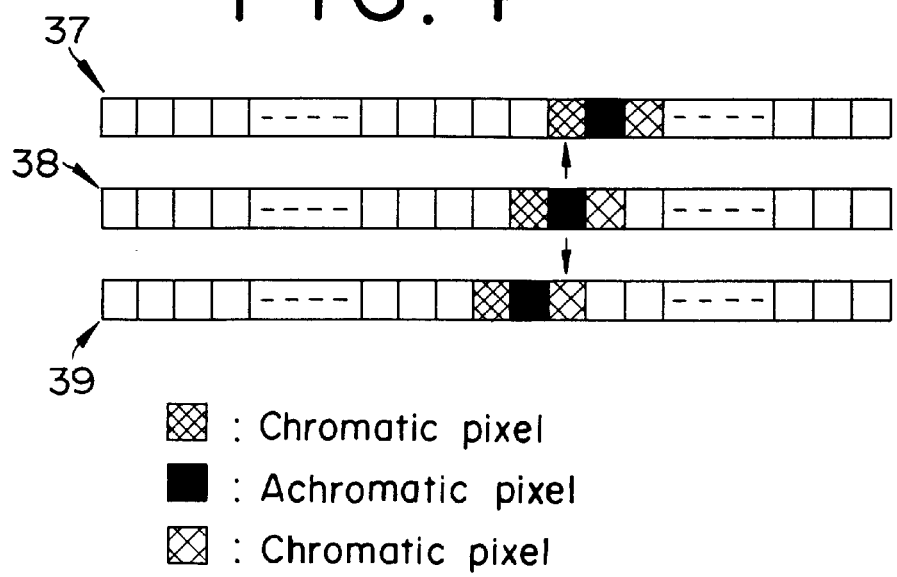
FIG. 4 is a drawing showing how color shifts are detected from a diagonal line pattern data stored in a line buffer.

Next, the pixels holding the same position as the position of the achromatic pixel detected at Step S3, as shown by arrows in FIG. 4, are detected in the line buffers 37 and 39 that store the diagonal line patterns of the (n−1)-st line and the (n+1)-st line, or the lines before and after the n-th line (S4).

The pixels detected at Step S4 are then judged whether they are chromatic or not (S5). If reading done is normal, chromatic pixels are not detected in the (n−1)-st line or the (n+1)-st line, so that the process advances to Step S10 (NO at S5). However, if a chromatic pixel is detected (YES at S5), it is assumed that one of the RGB color components has caused a color shift due to the inertia of the carriage of a slip of the mechanical system. Thus, any color shift can be securely detected as the RGB color CCD sensors read different positions. As a color shift is detected, the process advances to Step S6 to correct the color shift.

At Step S6, the color shift correction factor arithmetic unit 40 calculates the correction factor Xm1, Xm2, Xm3, Ym1, Ym2, Ym3, Zm1, Zm2 and Zm3 for each of the RGB color components based on the following formulas.

$$Xm1=r'_{(n-1)}/255, Xm2=r'_n/255, Xm3=r'_{(n+1)}/255$$

$$Ym1=g'_{(n-1)}/255, Ym2=g'_n/255, Ym3=g'_{(n+1)}/255$$

$$Zm1=b'_{(n-1)}/255, Zm2=b'_n/255, Zm3=b'_{(n+1)}/255$$

In the above formulas, r', g' and b' represent the data value of each color component of the achromatic or chromatic pixel detected at Step S3 and S4. The X row, the Y row and the Z row are the correction factors for the R, G and B components respectively. As a result of calculating the correction factors for color shifts from the relation between the detected achromatic pixel and the chromatic pixels appearing on the lines before and after the line the achromatic pixel is detected, a proper correction corresponding to the color shift actually occurring becomes possible. The reason for dividing the data values with 255 is that a pixel is expressed in 8 bit gradations, i.e., 256 gradations.

Next, the calculated correction factors are stored in the 3×3 buffer 41 (S7).

Next, the color correction arithmetic unit 42 conducts color corrections on the original image data stored in the line buffers 34, 35 and 36 based on the correction factors stored in the 3×3 buffer 41 (S8). The details of the color correction action will be described later.

Next, the 3×3 buffer 41 is cleared (S9). A judgment is made whether the image reading operation for a document surface is completed (S10). If the reading operation for a document surface is completed, the operation terminates.

If the reading operation for a document surface is not completed, the variable "n" is incremented by 1 (S11), the document data stored in the line buffer 35 is transferred to the line buffer 34, the document data stored in the line buffer 36 is transferred to the line buffer 35, the document data stored in the line buffer 38 is transferred to the line buffer 37, and the document data stored in the line buffer 39 is transferred to the line buffer 38 (S12).

Then, the process returns to Step S2 and the above processes are repeated until the reading operation for a document surface is completed.

Figure 6:
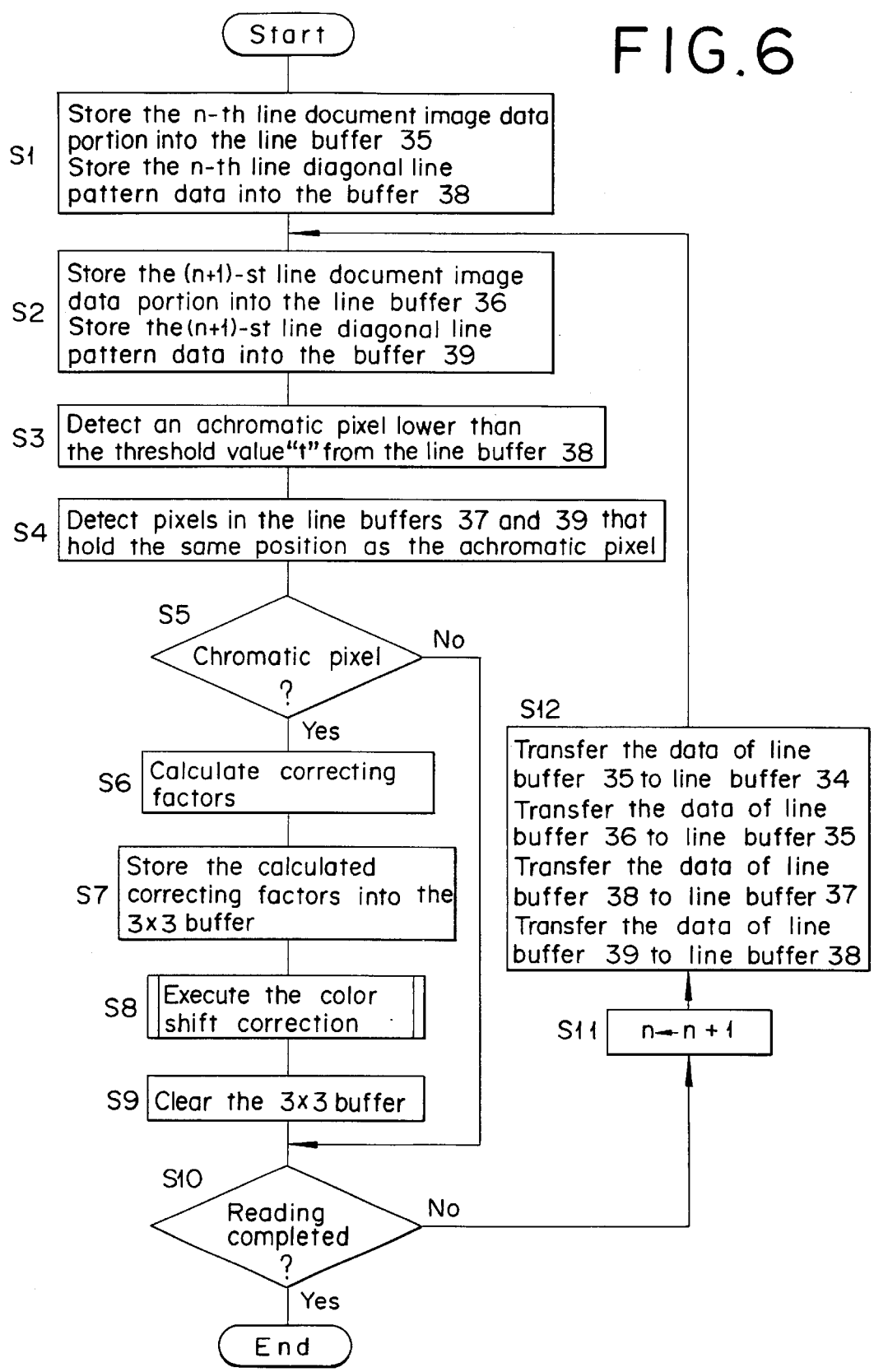
FIG. 6 is a flow chart for the operational sequence of the scanner.
Figure 7:
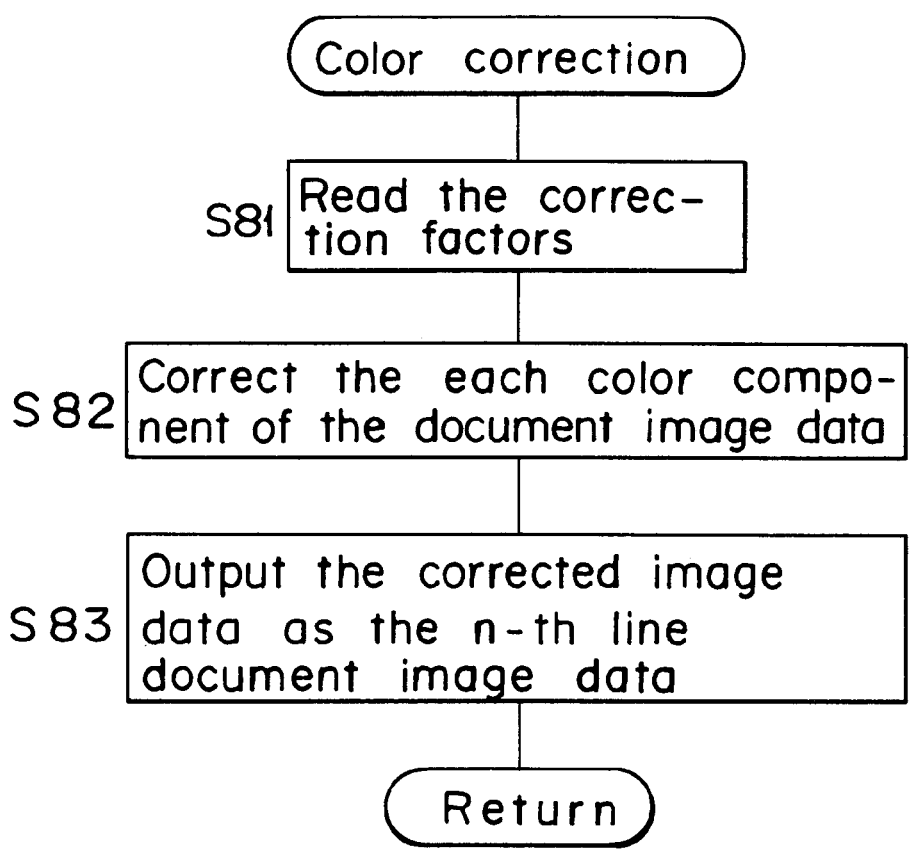
FIG. 7 is a flow chart for the color correction sequence subroutine of the flow chart shown in FIG. 6.

FIG. 7 is a flow chart of the color correction procedure subroutine shown at Step S8 of FIG. 6.

First, the color shift correction arithmetic unit 42 reads the correction factors Xm1, Xm2, Xm3, Ym1, Ym2, Ym3, Zm1, Zm2 and Zm3 stored in the 3×3 buffer 41 (S81).

Next, the unit calculates the weighted average of the document image data for three lines stored in the line buffers 34, 35 and 36 using the correction factor for each color component to obtain the corrected components Rn, Gn, and Bn of the image data for the n-th line (S82).

$$Rn = Xm1 \cdot r_{(n-1)} + Xm2 \cdot r_n + Xm3 \cdot r_{(n+1)} \quad (1)$$

$$Gn = Ym1 \cdot g_{(n-1)} + Ym2 \cdot g_n + Ym3 \cdot g_{(n+1)} \quad (2)$$

$$Bn = Zm1 \cdot b_{(n-1)} + Zm2 \cdot b_n + Zm3 \cdot b_{(n+1)} \quad (3)$$

In the above formulas, r, g and b are the color component of the document image data value for each line before the correction.

The corrected document image data is outputted to the image processing unit 43 as the n-th line document image data (S83). In the actual process, the steps S82 and S83 are executed together. In other words, the corrected document image data for the n-th line is outputted by means of repeating the operations of executing the correction for one pixel of the n-th line at S82, outputting the same at S83, correcting the next pixel at S82 and outputting the same at S83 until all pixels are corrected.

Next, the document image data of the n-th line outputted from the color shift correction arithmetic unit 42 is outputted via the external I/F 44 after making the MTF correction and the shading correction at the image processing unit 43 same as in the conventional method.

As a result of the above operation, if any color shift is detected from the data read from the diagonal line pattern, the correction factor is calculated using the diagonal line pattern. The document image data is corrected based on this correction factor and the image data for one line void of any color shift is outputted. Consequently, thanks to this embodiment, even in a situation where color shifts can occur any moment because of differences in the reading positions of the RGB color CCD sensors due to the inertia of the carriage or slips of the mechanical system, the color shifts can be instantaneously corrected on real time to be able to provide corrected image data. As a result, excellent color image without any color shifts can be obtained. Thus, the present invention prevents color shifts by correcting the document image data itself.

The present invention is not only applicable to the embodiment described above, but also applicable to a type of image reading apparatus using a carriage that reads the document image without stopping. Also, the CCD sensors can be fixedly provided in the scanner main body. In such a case, the reflected light form the document surface lighted by a white light source enters a CCD sensor after reflected by multiple mirrors to adjust the light path.

The present invention is also applicable to a scanner using a lens reduction type CCD sensor. Also, the present invention is not only applicable to the photoelectric conversion means is not limited to the three CCD sensors corresponding to R, G and B colors, but also to a scanner with a single CCD sensor with multiple color filters to enable to read in RGB colors successively.

It is obvious that the present invention is not limited to the particular embodiments shown and described above but may be variously changed and modified without departing from the technical concept of this invention.

What is claimed is:

1. An image reading apparatus comprising:
   multiple reading devices that can read images split into multiple colors individually, wherein said reading devices can travel in a secondary scanning direction;
   a pattern provided within the multiple reading devices' reading ranges consisting of diagonal lines set at a certain angle against the secondary scanning direction;
   a detecting unit that detects color shifts from the diagonal line pattern data obtained as the multiple reading devices read the pattern;
   an arithmetic unit that calculates a correcting factor for each color to be used for correcting color shifts based on the diagonal line pattern data obtained by the multiple reading devices; and
   a correcting unit that corrects image data based on the correcting factors, where the image data being obtained as the multiple reading devices read a document image.

2. An image reading apparatus as claimed in claim 1, wherein the multiple colors are red, green and blue.

3. An image reading apparatus as claimed in claim 2, wherein each reading device is equipped with multiple CCD elements arranged along a main scanning direction.

4. An image reading apparatus as claimed in claim 3, wherein reading devices are arranged at a certain interval along the secondary scanning direction.

5. An image reading apparatus capable of reading color images by means of scanning a document surface using multiple photoelectric conversion means of different reading wavelengths, comprising:
   a diagonal line pattern provided within reading ranges of said photoelectric conversion means;

a color shift detection means that detects color shifts from diagonal line pattern data obtained as said photoelectric conversion means read said diagonal line pattern;

a correction factor calculating means that calculates a correction factor to be used for correcting color shifts for each color component based on the diagonal line pattern read by said photoelectric conversion means when said color shift detection means detects color shifts; and a color correction means that corrects document image data value for each reading wave length read by said photoelectric conversion means based on the correction factors calculated by said correction factor calculating means.

6. An image reading apparatus as claimed in claim 5, wherein said diagonal line pattern consists of multiple achromatic color diagonal lines; and said color shift detection means detects color shifts by detecting an achromatic pixel from the achromatic diagonal line pattern data within one line read by said photoelectric conversion means and making a judgment whether pixels located at equivalent positions on the lines before and after said line are chromatic.

7. An image reading apparatus as claimed in claim 6, wherein said correction factor calculating means calculates correction factors based on the pixel value for each reading wavelength for said achromatic pixel detected by said color shift detection means, and pixel value for each reading wavelength for said chromatic pixels located at equivalent positions on the lines before and after the line said achromatic pixel is found.

8. An image reading apparatus as claimed in claim 5, wherein said photoelectric conversion means is provided on a traveling means that travels to scan the document surface;

said traveling means repeats cycles of traveling for one line along the main scanning direction and then stopping for scanning of the document surface, where said main scanning direction being the direction the elements of said photoelectric conversion means are arranged and the second scanning direction being the direction of traveling of said traveling means; and said photoelectric conversion means reads one line of image for each reading wavelength successively when said traveling means stops.

9. An image reading method for reading color images by scanning the document surface by means of multiple photoelectric means with different reading wavelengths;

a step of reading the document image as well as an achromatic diagonal line pattern provided within said photoelectric conversion means' reading range;

a step of detecting color shift from the diagonal line pattern thus read;

a step of calculating correction factors for correcting color shift from the data of the diagonal line pattern data read in the previous step when color shift is found; and a step of correcting based on the calculated correction factor the data of the document image read at the image reading step.

10. An image reading method as claimed in claim 9, wherein said image reading step is conducted while said photoelectric conversion means is at still during its cycle of traveling and stopping for each line for the purpose of scanning the document surface.

11. An image reading apparatus capable of reading color images by scanning a document surface using multiple photoelectric conversion units of different reading wavelengths, comprising:

a diagonal line pattern provided within reading ranges of said photoelectric conversion unit;

a color shift detection unit that detects color shifts from diagonal line pattern data obtained as said photoelectric conversion unit read said diagonal line pattern;

a correction factor calculating unit that calculates a correction factor to be used for correcting color shifts for each color component based on the diagonal line pattern read by said photoelectric conversion unit when said color shift detection unit detects color shifts; and a color correction unit that corrects document image data value for each reading wave length read by said photoelectric conversion unit based on the correction factors calculated by said correction factor calculating unit.

12. An image reading apparatus as claimed in claim 11, wherein said diagonal line pattern consists of multiple achromatic color diagonal lines; and said color shift detection unit detects color shifts by detecting an achromatic pixel from the achromatic diagonal line pattern data within one line read by said photoelectric conversion unit and making a judgment whether pixels located at equivalent positions on the lines before and after said line are chromatic.

13. An image reading apparatus as claimed in claim 12, wherein said correction factor calculating unit calculates correction factors based on the pixel value for each reading wavelength for said achromatic pixel detected by said color shift detection unit, and pixel value for each reading wavelength for said chromatic pixels located at equivalent positions on the lines before and after the line said achromatic pixel is found.

14. An image reading apparatus as claimed in claim 11, wherein said photoelectric conversion means is provided on a traveling unit that travels to scan the document surface;

said traveling unit repeats cycles of traveling for one line along the main scanning direction and then stopping for scanning of the document surface, where said main scanning direction being the direction the elements of said photoelectric conversion unit are arranged and the second scanning direction being the direction of traveling of said traveling unit; and said photoelectric conversion unit reads one line of image for each reading wavelength successively when said traveling unit stops.

* * * * *